United States Patent
Makino

(10) Patent No.: US 7,899,244 B2
(45) Date of Patent: Mar. 1, 2011

(54) COLOR SHIFT CORRECTION IMAGE PROCESSING METHOD AND IMAGE PROCESSING APPARATUS

(75) Inventor: Yoichiro Makino, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/622,515

(22) Filed: Nov. 20, 2009

(65) Prior Publication Data

US 2010/0188673 A1 Jul. 29, 2010

Related U.S. Application Data

(63) Continuation of application No. 11/193,862, filed on Jul. 29, 2005, now Pat. No. 7,653,239.

(30) Foreign Application Priority Data

Jul. 30, 2004 (JP) .................................. 2004-223358

(51) Int. Cl.
*G06K 9/00* (2006.01)
*G03F 3/08* (2006.01)

(52) U.S. Cl. ........................... 382/167; 382/162; 358/518

(58) Field of Classification Search .......... 382/162–167, 382/299; 348/538; 358/518
See application file for complete search history.

(56) References Cited

U.S. PATENT DOCUMENTS

| 5,202,935 | A | * | 4/1993 | Kanamori et al. | ............ 382/162 |
| 5,422,738 | A | * | 6/1995 | Ishihara et al. | ................ 358/500 |
| 5,598,482 | A | * | 1/1997 | Balasubramanian et al. | 382/199 |
| 5,703,644 | A | * | 12/1997 | Mori et al. | ..................... 348/363 |
| 5,995,669 | A | * | 11/1999 | Shingu et al. | .................. 382/237 |
| 6,058,208 | A | * | 5/2000 | Ikeda et al. | .................... 382/167 |
| 6,151,409 | A | * | 11/2000 | Chen et al. | ..................... 382/166 |
| 6,198,552 | B1 | * | 3/2001 | Nagae | ............................ 358/518 |
| 6,477,270 | B1 | * | 11/2002 | Wu | ................................ 382/167 |

(Continued)

FOREIGN PATENT DOCUMENTS

JP 04-011458 A 1/1992

(Continued)

OTHER PUBLICATIONS

Leemans et al. "Defects segmentation on 'Golden Delicious' apples using colour machine vision" Computers and Electronics in Agriculture, Jan. 16, 1998, pp. 117-130.

(Continued)

*Primary Examiner* — Bhavesh M Mehta
*Assistant Examiner* — Mia M Thomas
(74) *Attorney, Agent, or Firm* — Rossi, Kimms & McDowell LLP

(57) ABSTRACT

An image processing method and apparatus RGB luminance data for target pixel P(n) and adjacent pixels P(n−1) and P(n+1) to one set of luminance data L(i) and two sets of color difference data Cr(i) and Cb(i). Intermediate values Crm(n) and Cbm(n) for the color difference data are calculated for the pixels P(n−1), P(n). A change in the luminance data in the vicinity of the target pixel P(n) is determined. When a predetermined condition is satisfied, the intermediate values replace color difference data Cr'(n) and Cb'(n) for the target pixel P(n). When the predetermined condition is not satisfied, weighted average values of the intermediate values and original color difference values Cr(n) and Cb(n) replace the color difference data for the target pixel P(n). Thereafter, the color difference data for the target pixel P(n) and the luminance data that are not changed are again converted in the RGB color space.

3 Claims, 15 Drawing Sheets

U.S. PATENT DOCUMENTS

| | | | |
|---|---|---|---|
| 6,480,624 B1* | 11/2002 | Horie et al. | 382/165 |
| 6,504,551 B1* | 1/2003 | Takashima et al. | 345/649 |
| 6,504,953 B1* | 1/2003 | Behrends | 382/167 |
| 6,618,094 B1* | 9/2003 | De Haan et al. | 348/448 |
| 6,633,410 B1* | 10/2003 | Narushima | 358/1.9 |
| 6,665,434 B1* | 12/2003 | Yamaguchi | 382/162 |
| 6,701,007 B1* | 3/2004 | Yamaguchi | 382/162 |
| 6,731,413 B1* | 5/2004 | Nakazawa et al. | 358/502 |
| 6,791,712 B1* | 9/2004 | Gerrits | 358/1.9 |
| 6,791,716 B1* | 9/2004 | Buhr et al. | 358/1.9 |
| 6,798,534 B1* | 9/2004 | Nishigaki et al. | 358/1.16 |
| 6,847,737 B1* | 1/2005 | Kouri et al. | 382/260 |
| 6,862,366 B2* | 3/2005 | Bhattacharjya | 382/164 |
| 6,958,772 B1* | 10/2005 | Sugimori | 348/222.1 |
| 7,015,929 B2* | 3/2006 | Satomi et al. | 345/604 |
| 7,023,582 B2* | 4/2006 | Sawada et al. | 358/1.9 |
| 7,031,516 B2* | 4/2006 | Niko | 382/167 |
| 7,034,869 B2* | 4/2006 | Sugimori | 348/222.1 |
| 7,099,506 B2* | 8/2006 | Mishima | 382/166 |
| 7,108,945 B2* | 9/2006 | Sutani et al. | 430/5 |
| 7,173,734 B2* | 2/2007 | Klassen et al. | 358/1.9 |
| 7,272,266 B2* | 9/2007 | Kuo et al. | 382/274 |
| 7,355,753 B2* | 4/2008 | Yao | 358/1.9 |
| 7,373,020 B2* | 5/2008 | Tsukioka | 382/300 |
| 7,375,853 B2* | 5/2008 | Nozaki | 358/1.9 |
| 7,400,333 B1* | 7/2008 | Trottier et al. | 345/603 |
| 7,421,117 B2* | 9/2008 | Kondo et al. | 382/166 |
| 7,433,089 B2* | 10/2008 | Enomoto | 358/474 |
| 7,551,318 B2* | 6/2009 | Nagoshi et al. | 358/1.9 |
| 7,653,239 B2* | 1/2010 | Makino | 382/162 |
| 7,812,878 B2* | 10/2010 | Kudoh | 348/308 |
| 2002/0131634 A1* | 9/2002 | Weibrecht et al. | 382/162 |
| 2003/0031375 A1* | 2/2003 | Enomoto | 382/255 |
| 2003/0039402 A1* | 2/2003 | Robins et al. | 382/275 |
| 2003/0053689 A1* | 3/2003 | Watanabe et al. | 382/167 |
| 2003/0067548 A1* | 4/2003 | Sugimori | 348/273 |
| 2003/0103649 A1* | 6/2003 | Shimakage | 382/104 |
| 2003/0113013 A1* | 6/2003 | Hammadou | 382/166 |
| 2003/0174884 A1* | 9/2003 | Levy et al. | 382/167 |
| 2003/0195998 A1* | 10/2003 | Estrop | 709/323 |
| 2003/0219655 A1* | 11/2003 | Sutani et al. | 430/5 |
| 2004/0001621 A1* | 1/2004 | Kusakabe et al. | 382/164 |
| 2004/0013352 A1* | 1/2004 | Khayim et al. | 385/24 |
| 2004/0046772 A1* | 3/2004 | Ouchi et al. | 345/690 |
| 2004/0071340 A1* | 4/2004 | Kondo et al. | 382/162 |
| 2004/0071363 A1* | 4/2004 | Kouri et al. | 382/276 |
| 2004/0228542 A1* | 11/2004 | Zhang et al. | 382/275 |
| 2005/0041116 A1* | 2/2005 | Tsukioka | 348/229.1 |
| 2005/0162298 A1* | 7/2005 | Kuzumoto | 341/155 |
| 2005/0281464 A1* | 12/2005 | Kaku | 382/173 |
| 2006/0023943 A1* | 2/2006 | Makino | 382/167 |
| 2006/0038904 A1* | 2/2006 | Kudoh | 348/308 |
| 2006/0072128 A1* | 4/2006 | Ng et al. | 358/1.9 |
| 2006/0092485 A1* | 5/2006 | Tamaru | 358/518 |
| 2006/0232690 A1* | 10/2006 | Tamura et al. | 348/242 |
| 2007/0229676 A1* | 10/2007 | Tanaka et al. | 348/223.1 |
| 2007/0229868 A1* | 10/2007 | Kanai | 358/1.9 |
| 2009/0022393 A1* | 1/2009 | Bar-Zohar et al. | 382/154 |
| 2009/0167906 A1* | 7/2009 | Wu et al. | 348/242 |
| 2010/0061625 A1* | 3/2010 | Lukac | 382/162 |
| 2010/0188673 A1* | 7/2010 | Makino | 358/1.9 |

FOREIGN PATENT DOCUMENTS

| | | |
|---|---|---|
| JP | 2000-224375 A | 8/2000 |
| JP | 2002-142122 A | 5/2002 |
| JP | 2003-259135 A | 9/2003 |
| JP | 2004-96625 A | 3/2004 |
| JP | 2004-104620 A | 4/2004 |

OTHER PUBLICATIONS

Malik et al."Contour and Texture Analysis for Image Segmentation" Intr. Journal of Computer Vision 43(1), 7-27, 2001, pp. 1-21.

Rosin et al. "Image Difference Threshold Strategies and Shadow Detection" pp. 1-10.

Shen et al. "A Fast Algorithm for Video Parsing Using MPEG Compressed Sequences" 1995 IEEE, pp. 252-255.

Translation of the Decision of Rejection issued in corresponding Japanese application No. 2004-223358, dated Feb. 13, 2007.

* cited by examiner

FIG. 2

DATA BEFORE CORRECTION (RGB-In-2)

|    | R   | G   | B   |
|----|-----|-----|-----|
| Y1 | 255 | 255 | 255 |
| Y2 | 255 | 255 | 255 |
| Y3 | 230 | 147 | 62  |
| Y4 | 2   | 0   | 0   |
| Y5 | 0   | 0   | 0   |
| Y6 | 0   | 0   | 0   |
| Y7 | 0   | 0   | 0   |

⇑ $f'(*)$

AFTER CONVERSION OF COLOR SPACE (LCC-In-2)

|    | L   | Cr   | Cb   |
|----|-----|------|------|
| Y1 | 255 | 0    | 0    |
| Y2 | 255 | 0    | 0    |
| Y3 | 163 | 66.6 | −101 |
| Y4 | 0.6 | 1.4  | −0.6 |
| Y5 | 0   | 0    | 0    |
| Y6 | 0   | 0    | 0    |
| Y7 | 0   | 0    | 0    |

⇑ $c'(*)$

AFTER CORRECTION OF COLOR SHIFT (LCC-Out-2)

|    | L   | Cr'  | Cb'  |
|----|-----|------|------|
| Y1 | 255 | 0    | 0    |
| Y2 | 255 | 0    | 0    |
| Y3 | 163 | 1.4  | −0.6 |
| Y4 | 0.6 | 1.4  | −0.6 |
| Y5 | 0   | 0    | 0    |
| Y6 | 0   | 0    | 0    |
| Y7 | 0   | 0    | 0    |

⇑ $g'(*)$

AFTER INVERSE CONVERSION OF COLOR SPACE (RGB-Out-2)

|    | R'  | G'  | B'  |
|----|-----|-----|-----|
| Y1 | 255 | 255 | 255 |
| Y2 | 255 | 255 | 255 |
| Y3 | 165 | 163 | 163 |
| Y4 | 2   | 0   | 0   |
| Y5 | 0   | 0   | 0   |
| Y6 | 0   | 0   | 0   |
| Y7 | 0   | 0   | 0   |

FIG. 4

DATA BEFORE CORRECTION (RGB-In-4)

| | R | G | B |
|---|---|---|---|
| Y1 | 0 | 0 | 0 |
| Y2 | 0 | 0 | 0 |
| Y3 | 0 | 58 | 132 |
| Y4 | 132 | 74 | 0 |
| Y5 | 0 | 0 | 0 |
| Y6 | 0 | 0 | 0 |
| Y7 | 0 | 0 | 0 |

⇑ f'(*)

AFTER CONVERSION OF COLOR SPACE (LCC-In-4)

| | L | Cr | Cb |
|---|---|---|---|
| Y1 | 0 | 0 | 0 |
| Y2 | 0 | 0 | 0 |
| Y3 | 48 | −48 | 84 |
| Y4 | 84 | 48 | −84 |
| Y5 | 0 | 0 | 0 |
| Y6 | 0 | 0 | 0 |
| Y7 | 0 | 0 | 0 |

⇑ c'(*)

AFTER CORRECTION OF COLOR SHIFT (LCC-Out-4)

| | L | Cr' | Cb' |
|---|---|---|---|
| Y1 | 0 | 0 | 0 |
| Y2 | 0 | 0 | 0 |
| Y3 | 48 | 0 | 0 |
| Y4 | 84 | 12 | −21 |
| Y5 | 0 | 0 | 0 |
| Y6 | 0 | 0 | 0 |
| Y7 | 0 | 0 | 0 |

⇑ g'(*)

AFTER INVERSE CONVERSION OF COLOR SPACE (RGB-Out-4)

| | R' | G' | B' |
|---|---|---|---|
| Y1 | 0 | 0 | 0 |
| Y2 | 0 | 0 | 0 |
| Y3 | 48 | 48 | 48 |
| Y4 | 96 | 81.5 | 63 |
| Y5 | 0 | 0 | 0 |
| Y6 | 0 | 0 | 0 |
| Y7 | 0 | 0 | 0 |

FIG. 6

DATA BEFORE CORRECTION (RGB-In-6)

| | R | G | B |
|---|---|---|---|
| Y1 | 255 | 255 | 178 |
| Y2 | 255 | 255 | 178 |
| Y3 | 230 | 147 | 43 |
| Y4 | 2 | 0 | 0 |
| Y5 | 0 | 0 | 0 |
| Y6 | 0 | 0 | 0 |
| Y7 | 0 | 0 | 0 |

⇑ f'(*)

AFTER CONVERSION OF COLOR SPACE (LCC-In-6)

| L | Cr | Cb |
|---|---|---|
| 247 | 7.7 | −69 |
| 247 | 7.7 | −69 |
| 162 | 68.5 | −119 |
| 0.6 | 1.4 | −0.6 |
| 0 | 0 | 0 |
| 0 | 0 | 0 |
| 0 | 0 | 0 |

⇑ c'(*)

AFTER CORRECTION OF COLOR SHIFT (LCC-Out-6)

| L | Cr' | Cb' |
|---|---|---|
| 247 | 7.7 | −69 |
| 247 | 7.7 | −69 |
| 162 | 7.7 | −69 |
| 0.6 | 1.4 | −0.6 |
| 0 | 0 | 0 |
| 0 | 0 | 0 |
| 0 | 0 | 0 |

⇑ g'(*)

AFTER INVERSE CONVERSION OF COLOR SPACE (RGB-Out-6)

| R' | G' | B' |
|---|---|---|
| 255 | 255 | 178 |
| 255 | 255 | 178 |
| 169 | 169 | 92.2 |
| 2 | 0 | 0 |
| 0 | 0 | 0 |
| 0 | 0 | 0 |
| 0 | 0 | 0 |

FIG. 12

DATA BEFORE CORRECTION (RGB-In-12)

|    | R   | G   | B   |
|----|-----|-----|-----|
| Y1 | 255 | 255 | 255 |
| Y2 | 255 | 255 | 255 |
| Y3 | 196 | 111 | 250 |
| Y4 | 0   | 0   | 245 |
| Y5 | 15  | 96  | 250 |
| Y6 | 253 | 255 | 255 |
| Y7 | 255 | 255 | 255 |

⇨ f'(*)

AFTER CONVERSION OF COLOR SPACE (LCC-In-12)

|    | L    | Cr    | Cb  |
|----|------|-------|-----|
| Y1 | 255  | 0     | 0   |
| Y2 | 255  | 0     | 0   |
| Y3 | 167  | 29    | 83  |
| Y4 | 61.3 | −61.3 | 184 |
| Y5 | 115  | −100  | 135 |
| Y6 | 255  | −1.5  | 0.5 |
| Y7 | 255  | 0     | 0   |

⇨ c'(*)

AFTER CORRECTION OF COLOR SHIFT (LCC-Out-12)

|    | L    | Cr'   | Cb' |
|----|------|-------|-----|
| Y1 | 255  | 0     | 0   |
| Y2 | 255  | 0     | 0   |
| Y3 | 167  | 0     | 83  |
| Y4 | 61.3 | −61.3 | 159 |
| Y5 | 115  | −61.3 | 135 |
| Y6 | 255  | −1.5  | 0.5 |
| Y7 | 255  | 0     | 0   |

⇨ g'(*)

AFTER INVERSE CONVERSION OF COLOR SPACE (RGB-Out-12)

|    | R'  | G'   | B'  |
|----|-----|------|-----|
| Y1 | 255 | 255  | 255 |
| Y2 | 255 | 255  | 255 |
| Y3 | 167 | 126  | 250 |
| Y4 | 0   | 12.3 | 221 |
| Y5 | 54  | 78.5 | 250 |
| Y6 | 253 | 255  | 255 |
| Y7 | 255 | 255  | 255 |

COLOR SHIFT CORRECTION IMAGE PROCESSING METHOD AND IMAGE PROCESSING APPARATUS

CROSS REFERENCE TO RELATED APPLICATION

This is a continuation of and claims priority from U.S. patent application Ser. No. 11/193,862 filed Jul. 29, 2005 the content of which is incorporated herein by reference.

BACKGROUND OF THE INVENTION

1. Field of the Invention

The present invention relates to an image processing method and an image processing apparatus for correcting for color shift (color registration error, out of color registration) occurring in color image data.

2. Related Background Art

An image forming apparatus such as a color copier, or a color, multi-functional apparatus, that reads an original image and forms a color image includes an image scanner unit for reading images and a printer unit for printing the images read by the image scanner. Further, image scanner apparatuses are widely employed with personal computers for reading in originals as electronic image data.

An image scanner unit or an image scanner apparatus generally employs a line sensor, such as a charge coupled device (CCD) or a contact image sensor (CIS), wherein multiple light-receiving devices (photo-electric converting devices that accumulate incident light and convert it into an electric signal) are linearly arranged. And the image scanner unit or the image scanner apparatus reads an original image by moving the line sensor in a direction (a sub-scanning direction) perpendicular to the direction (the main scanning direction) in which the light-receiving devices are arranged. Some image scanner units or image scanner apparatuses are so configured that when reading images the original is moved while a line sensor is fixed.

In either event, whether an image is read while the line sensor or the original is moved, color shift occurs due to mechanical vibrations, transmitted by the drive mechanism while moving the line sensor or the original in the sub-scanning direction, or due to the affect of feeding accuracy.

As one process employed for reading an image, a sequential line reading method is used, and in the method, the sequential emission, by light sources, of light in three colors, R (red), G (green) and B (blue) is conducted, and these three colors are used to read an original image. According to the sequential line reading method, since generally either the line sensor or the original to be read is moved sequentially, the reading positions at the light emission timings of the R, G, B colors are shifted in the sub-scanning direction, as described above, so that when an original, such as a character or a line drawing, is read, color shift occurs and the image quality is deteriorated accordingly.

In order to correct or reduce color shift, various image processing methods have been proposed.

According to one of these image processing methods, a color shift correction process is employed that provides for the replacement of the image data read for each line by a weighted average obtained for the image data in that line and the image data in an immediately preceding or succeeding line of the same color. In Japanese Patent Application Laid-Open No. 2000-224375, a method is disclosed whereby the order in which R, G, B light is emitted is arranged so as to further improve the positioning accuracy of the R, G, B colors in the individual lines after averaging has been performed. Further, in Japanese Patent Application Laid-Open No. 2002-142122, a method is disclosed whereby each line is read at double the resolution in the sub-scanning direction, the weighted average is calculated for the image data in that line and the image data in the immediately preceding and succeeding line, and thereafter, a thinning operation is performed.

According to another method disclosed in Japanese Patent Application Laid-Open No. Hei 04-011458, image data read by the emission of individual light colors are converted into luminance data and color difference data, and a spatial frequency band limitation is applied only to the color difference data, so that color shift is reduced while resolution is maintained. In Japanese Patent Application Laid-Open No. 2003-259135, a still another method is disclosed whereby image data are converted into luminance data and saturation data, and of the pixels neighboring each target pixel, the one having the lowest luminance is regarded as a determination pixel, and whereby, when it is determined in accordance with the saturation data for the vicinity of the determination pixel that the target pixel has an achromatic color, the data for the target pixel are replaced with data for an achromatic color to change the image into a clear black image.

However, the method whereby image data for each read line are replaced by the weighted average for the image data of that line and image data for the immediately preceding or succeeding line of the same color is not preferable, because not only are pixels where color shift occurs, but also the basic function, i.e., the image resolution, is reduced. In addition, as a result of the weighted average processing, color shift is reduced but is not completely removed.

Further, according to the method whereby each line is read at double the resolution in the sub-scanning direction, the weighted average process is performed for the obtained image data and the resultant data are thinned out, a reduction in the resolution can be avoided. However, since the reading resolution is doubled, accordingly, the amount of pixel data to be processed is also doubled. That is, for a color shift correction circuit for which the operating speed remains the same, twice the reading time would be required. Although this method could be employed without extending the reading time by doubling the operating speed of the color shift correction circuit, the cost of an apparatus would be increased to realize a circuit structure that could operate at the high speed required, and therefore, this method is also not preferable.

Furthermore, according to the method whereby spatial frequency band limitation is provided only for color difference data, the resolution, the reading time and the cost are less affected. However, the degree of color shift is merely reduced by the spatial frequency band limitation, and is not still completely removed.

Moreover, according to the method whereby a pixel determined to be an achromatic color is replaced with black (or gray), satisfactory effects can be obtained for black characters. However, no process is performed, for example, for color shift at the contours of characters having other colors and for color shift at black characters in a chromatic color background.

While focusing on these conventional shortcomings, the object of the present invention is to provide an image processing method and an image processing apparatus for correcting color shift occurring at the contours of characters, regardless of the character colors, and to output a clear image for which the color shift of contours is corrected, even when the background color is other than white.

SUMMARY OF THE INVENTION

To achieve the above object, a method and an apparatus according to the present invention for processing images are constituted as follows.

An image processing method is provided, in which an operational process for producing new image data for the target pixel by computing luminance data and color difference data are computed for one target pixel of pixels forming an input image and for a neighboring pixel of the target pixel, can be applied for individual pixels forming the input image, said the operational process for the target pixel includes:

a contour detection step of determining whether the target pixel is a constituent pixel of a contour of the input image, on the basis of the luminance data for the target pixel and the neighboring pixel, an operating step of calculating new color difference data by employing an operational algorithm that is selected from among multiple operational algorithms, including first and second operational algorithms, in accordance with the decision at the contour detection step, and a step of synthesizing the new color difference data obtained at the operation step with the luminance data for the target pixel to acquire luminance data corresponding to the target pixel, wherein the first operational algorithm is a calculation for employing a median filter to the color difference data for the target pixel and the neighboring pixel and for regarding output color difference data as the new color difference data, and the second operational algorithm is a calculation for employing a median filter to the color difference data for the target pixel and the neighboring pixel and calculating a weighted average value for color difference data that is output and the color difference data for the target pixel, and for regarding the resultant color difference data as new color difference data.

Further, an image processing apparatus for preforming image processing for pixels of an input image comprises:

a first color space conversion circuit for converting image data for the pixels of the input image into luminance data and color difference data;

a median filter circuit for calculating an intermediate value between the color difference data for a target pixel and a neighboring pixel of the target pixel, and for outputting first output color difference data;

a contour detection circuit for determining whether the target pixel is a constituent pixel of a contour of the input pixel, on the basis of the luminance data for the target pixel and the neighboring pixel;

a weighted average calculation circuit for calculating a weighted average value for the color difference data of the target pixel of the input image and the first output color difference data, and for obtaining second output color difference data;

a color difference data selection circuit for, when the contour detection circuit detects that the target pixel is a contour pixel, selecting the first output color difference data as new color difference data, and for, when the contour detection circuit detects that the target pixel is not a contour pixel, selecting the second output color difference data as new color difference data; and a second color space conversion circuit for synthesizing the new color difference data, selected by the color difference data selection circuit, with the luminance data for the target pixel of the input image so as to obtain new image data corresponding to the target pixel.

BRIEF DESCRIPTION OF THE DRAWINGS

FIG. 2 is a series of tables specifically showing color shift removal effects obtained by performing the color shift correction processing in FIG. 1 for a black character in white background;

FIG. 4 is a series of tables specifically showing color shift removal effects obtained by performing the color shift correction processing in FIG. 1 for a white, fine line image in black background;

FIG. 6 is a series of tables specifically showing color shift removal effects obtained by performing the color shift correction processing in FIG. 1 for a black character in yellow background;

FIG. 12 is a series of tables specifically showing color shift removal effects obtained when a blue line image in white background is transmitted to the color shift correction circuit in FIG. 10;

DETAILED DESCRIPTION OF THE PREFERRED EMBODIMENTS

The preferred embodiments of the present invention will now be described in detail while referring to the accompanying drawings.

First Embodiment

Figure 1:
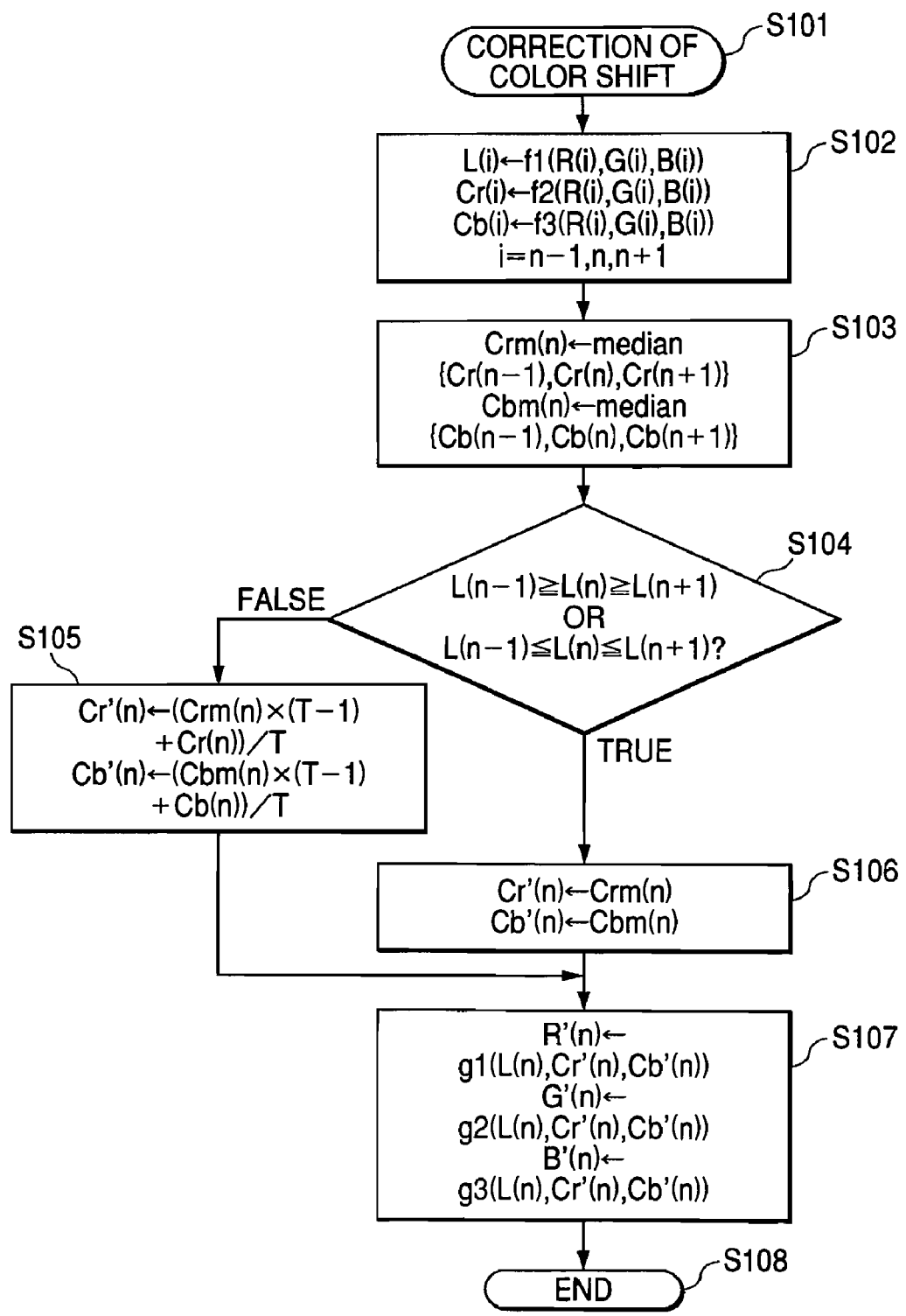
FIG. 1 is a flowchart showing color shift correction processing that employs an image processing method according to a first embodiment of the present invention.

FIG. 1 is a flowchart showing the color shift (color registration error, out of color registration) correction processing that employs an image processing method according to a first embodiment of the present invention.

During the color shift correction processing for this embodiment, image data for a target pixel P(n) are corrected based on image data for the vicinity of the target pixel P(n) in a direction in which color shift to be corrected occurs, i.e., image data for adjacent pixels P(n−1) and P(n+1) on both sides of the target pixel P(n). The color shift correction processing is performed for all the image data, except for the leading line and the trailing line on the screen for image data; however, in this embodiment, an arbitrary target pixel P(n) is employed, and a detailed explanation will be given for the processing employed to correct the color shift of the target pixel P(n).

Generally, when an original is read to obtain image data, color shift tends to occur in the direction in which the line sensor or the original is moved (the sub-scanning direction). Therefore, the pixel P(n−1) immediately preceding and the pixel P(n+1) immediately succeeding the target pixel P(n) are sequentially read by the same light-receiving element of the line sensor and are employed as adjacent pixels for the color shift correction processing.

During the color shift correction processing, luminance data R(i), G(i) and B(i), for three primary colors, are received as image data for each pixel P(i), and luminance data R(n), G(n) and B(n) for the target pixel P(n) are replaced with luminance data R'(n), G'(n) and B'(n).

In this embodiment, it is assumed that image data to be processed for color shift correction, i.e., image data for the pixels P(n−1), P(n) and P(n+1), have already been read from the original and stored, for example, in a memory (not shown).

The color shift correction processing for this embodiment will now be described in detail.

First, at step S102, the color space conversion process is performed for input image data. For example, the following expressions (1a), (1b) and (1c) are employed to convert the R, G and B luminance data for the target pixel P(n) and the R, G and B luminance data for the pixels P(n−1) and P(n+1) adjacent to the target pixel P(n) into one set of luminance data L(i) and two sets of color difference data Cr(i) and Cb(i).

$$L(i)=0.3R(i)+0.6G(i)+0.1B(i) \tag{1a}$$

$$Cr(i)=R(i)-L(i) \tag{1b}$$

$$Cb(i)=B(i)-L(i) \tag{1c}$$

wherein i=n−1, n or n+1.

At step S103, intermediate (median) values Crm(n) and Cbm(n) for the color difference data Cr(i) and Cb(i) for the pixels P(n−1), P(n) and P(n+1) are calculated. Crm(n) can be obtained, for example, using the following program (algorithm).

if Cr(n−1)≧Cr(n)
  if Cr(n)≧Cr(n+1) then Crm(n)=Cr(n)
  else if Cr(n−1)≧Cr(n+1) then Crm(n)=Cr(n+1)
    else Crm(n)=Cr(n−1)
else
  if Cr(n+1)≧Cr(n) then Crm(n)=Cr(n)
  else if Cr(n−1)≧Cr(n+1) then Crm(n)=Cr(n−1)
    else Crm(n)=Cr(n+1)
Cbm(n) is obtained in the same manner.

At step S104, the change in the luminance data in the vicinity of the target pixel P(n) is determined. That is, when the luminance data L(n) for the target pixel P(n) satisfies one of the following inequalities, either (2a) or (2b), the decision is (True), and the process at step S106 is performed.

$$L(n-1) \geq L(n) \geq L(n+1) \tag{2a}$$

$$L(n-1) \leq L(n) \leq L(n+1) \tag{2b}$$

The respective definitions of these conditions are monotone decreasing (2) and monotone increasing (2), and when either condition is satisfied, it is assumed that the target pixel P(n) is positioned at the edge (e.g., the character boundary) of an image.

When the decision at step S104 is True, the process at step S106 is performed, and color difference data Cr'(n) and Cb'(n) for the target pixel P(n) are respectively replaced by the intermediate values obtained at step S103.

$$Cr'(n)=Crm(n) \tag{3a}$$

$$Cb'(n)=Cbm(n) \tag{3b}$$

In this process, when color shift has occurred at the edges of the original image, the color difference value of the target pixel is replaced with the intermediate color difference value of the vicinity. As a result, the color of the pixel for which color shift has occurred is similar to the surrounding color, and the color shift is reduced.

When the decision at step S104 is False, the process at step S105 is performed. At step S105, the color data difference data Cr'(n) and Cb'(n) for the target pixel P(n) are replaced by the respective weighted averages of the intermediate values Crm(n) and Cbm(n) obtained at step S103 and the original color difference values Cr(n) and Cb(n).

$$Cr'(n)=(Crm(n) \times (T-1)+Cr(n))/T \tag{4a}$$

$$Cb'(n)=(Cbm(n) \times (T-1)+Cb(n))/T \tag{4b}$$

"T" is a given constant equal to or greater than "1". When "4", for example, is employed as "T", the weight applied to the intermediate value for color difference is "0.75", while the weight applied to the original color difference value of the target pixel is "0.25", and the color shift that has occurred along an achromatic color fine line having a width of one dot or smaller is reduced to about ¼. Further, for a chromatic color fine line having a width of one dot or smaller, which is hard to identify due to the phenomenon of color shift, ¼ of the color difference data is maintained, so that the inconvenience of having to replace a chromatic color fine line with an achromatic color fine line can be avoided.

The color difference data Cr'(n) and Cb'(n) for the target pixel P(n), obtained by replacement at either step S105 or S106, and the luminance data L(n), which are not changed, are re-converted in a RGB color space by the inverse conversion of expressions (1a), (1b) and (1c) (step S107).

$$R'(n)=Cr'(n)+L(n) \tag{5a}$$

$$G'(n)=(L(n)-0.3 \times R'(n)-0.1 \times B'(n))/0.6 \tag{5b}$$

$$B'(n)=Cb'(n)+L(n) \tag{5c}$$

When the above described color shift correction processing is performed for all the pixels, not only for an image wherein the background or the character is an achromatic color such as white or black, but also for an image where a color difference is present at the edge (a pixel at the boundary of the background) of the character, the color difference at the edge of the character is replaced by a color difference in the vicinity of the character, so that the color shift can be corrected or reduced.

At step S106, as represented by expression (3a) and (3b), the color difference data for the target pixel P(n) are directly replaced by the intermediate values. However, depending on the image, the sign of the color difference data Cr(n) (or Cb(n)) for the target pixel may differ from the sign for the selected intermediate value Crm(n) (or Cbm(n)), i.e., the hue may be inverted. In this case, the process for replacing Crm(n) (or Cbm(n)) with "0", i.e., the achromatic color characteristic, is added to step S106, so that an unnatural color difference correction can be prevented. Similarly, when, at step S105, the hue is inverted in replacing the color difference data for the target pixel with the weighted average values using expressions (4a) and (4b), the process for replacing the color difference data with an achromatic color characteristic is added. Then, more preferable results can be obtained.

The effects provided by the image processing method of this embodiment will now be described by employing specific example numerical values.

FIGS. 2 to 9 are tables and graphs showing that, for individual sample image data, color shift is effectively removed or reduced by the image processing method of the embodiment. These specific examples will now be described in detail.

Figure 3:
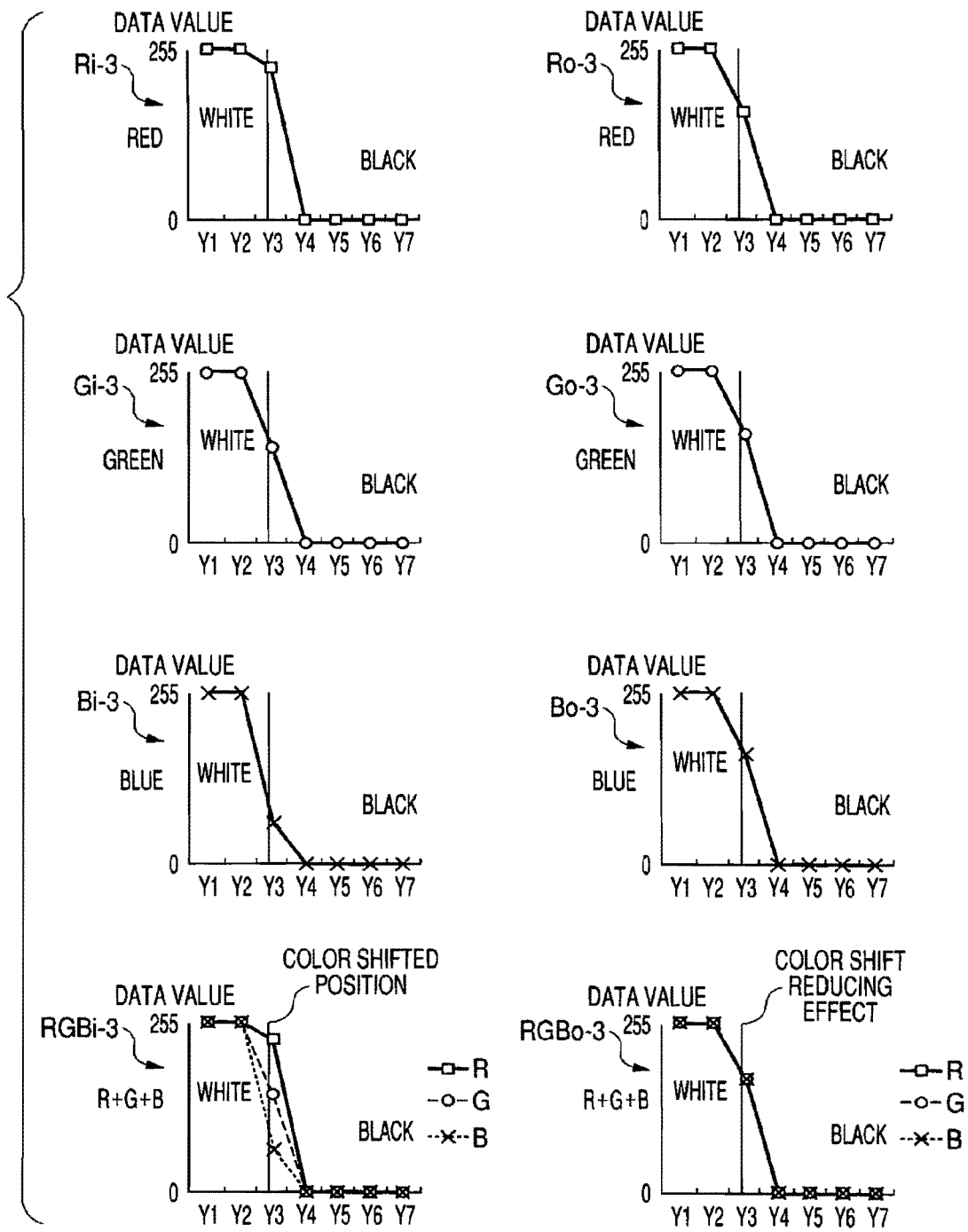
FIG. 3 is a series of graphs specifically showing the color shift removal effects obtained by performing the color shift correction processing in FIG. 1 for the black character in white background.

FIGS. 2 and 3 are diagrams showing color shift that has occurred at the edge portion (boundary) of a black character in a white background, and the removal effects. In FIG. 2, Y1 to Y7 indicate the sub-scanning positions of individual sample pixels. Also in FIG. 2, the transition of individual data values is shown, i.e., through the color space conversion process f' at step S102, data (RGB-In-2) before correction in the RGB color space are converted into values (LCC-In-2) in the LCrCb color space, through the color shift correction process c' at steps S103 to S106, one part of the color difference is replaced (LCC-Out-2), and through the color space inversion conversion process g' at step S107, corrected RGB data (RGB-Out-2) are obtained. It should be noted that in FIG. 2 numerical values are given to three significant figures, or to the first decimal.

As for the RGB data before correction, positions Y1 and Y2, where R=G=B=255, are the white background, positions Y5, Y6 and Y7, where R=G=B=0, are the black character portions, and positions Y3 and Y4 are where the color shift has occurred.

The intermediate value Crm(n) of the color difference data Cr for the vicinity of the target pixel P(n) is calculated by using the following expressions (6a) to (6d). It should be noted that median $\{*, *, *\}$ represents an operation for selecting three numerical intermediate values enumerated in $\{\ \}$.

$$Crm(Y2) = \text{median}\{Cr(Y1), Cr(Y2), Cr(Y3)\} \quad (6a)$$
$$= \{0, 0, 66.6\}$$
$$= 0$$

$$Crm(Y3) = \text{median}\{Cr(Y2), Cr(Y3), Cr(Y4)\} \quad (6b)$$
$$= \{0, 66.6, 1.4\}$$
$$= 1.4$$

$$Crm(Y4) = \text{median}\{Cr(Y3), Cr(Y4), Cr(Y5)\} \quad (6c)$$
$$= \{66.6, 1.4, 0\}$$
$$= 1.4$$

$$Crm(Y5) = \text{median}\{Cr(Y4), Cr(Y5), Cr(Y6)\} \quad (6d)$$
$$= \{1.4, 0, 0\}$$
$$= 0$$

The intermediate value Cbm(n) of the color difference data Cb can be obtained in the same manner.

Since, while referring to FIG. 2, after the color space conversion the value L of the value LCrCb (LCC-In-2) is monotonously decreased, and since the luminance distribution decision at step S104 in FIG. 1 is all True, the replacement process at step S106 is performed. As a result of this process, the color difference at position Y3, where the color shift has occurred, is changed from $$Cr(Y3) = 66.6$$

$$Cb(Y3) = -101$$

to $$Cr'(Y3) = Crm(Y3) = 1.4$$

$$Cb'(Y3) = Cbm(Y3) = -0.6,$$

so that the color shift can be removed.

FIG. 3 is a series of graphs showing the levels of the RGB image data relative to the sub-scanning positions of the individual sample pixels. The horizontal axis represents the sub-scanning position (Yn) of each sample pixel, and the vertical axis represents the level of the RGB image data. The graphs in FIG. 3 are prepared by plotting image data shown in the table RGB-In-2 and the table RGB-Out-2 in FIG. 2. As shown in graph RGBi-3 in FIG. 3, before the color shift correction processing is performed, the levels of the R, G and B image data differ greatly at position Y3, and causes color shift at the edge portion where white is shifted to black. On the other hand, in graph RGBo-3, after the color shift correction processing is performed, the levels of R, G and B image data substantially overlap, and the color shift at the edge portion is effectively reduced.

Figure 5:
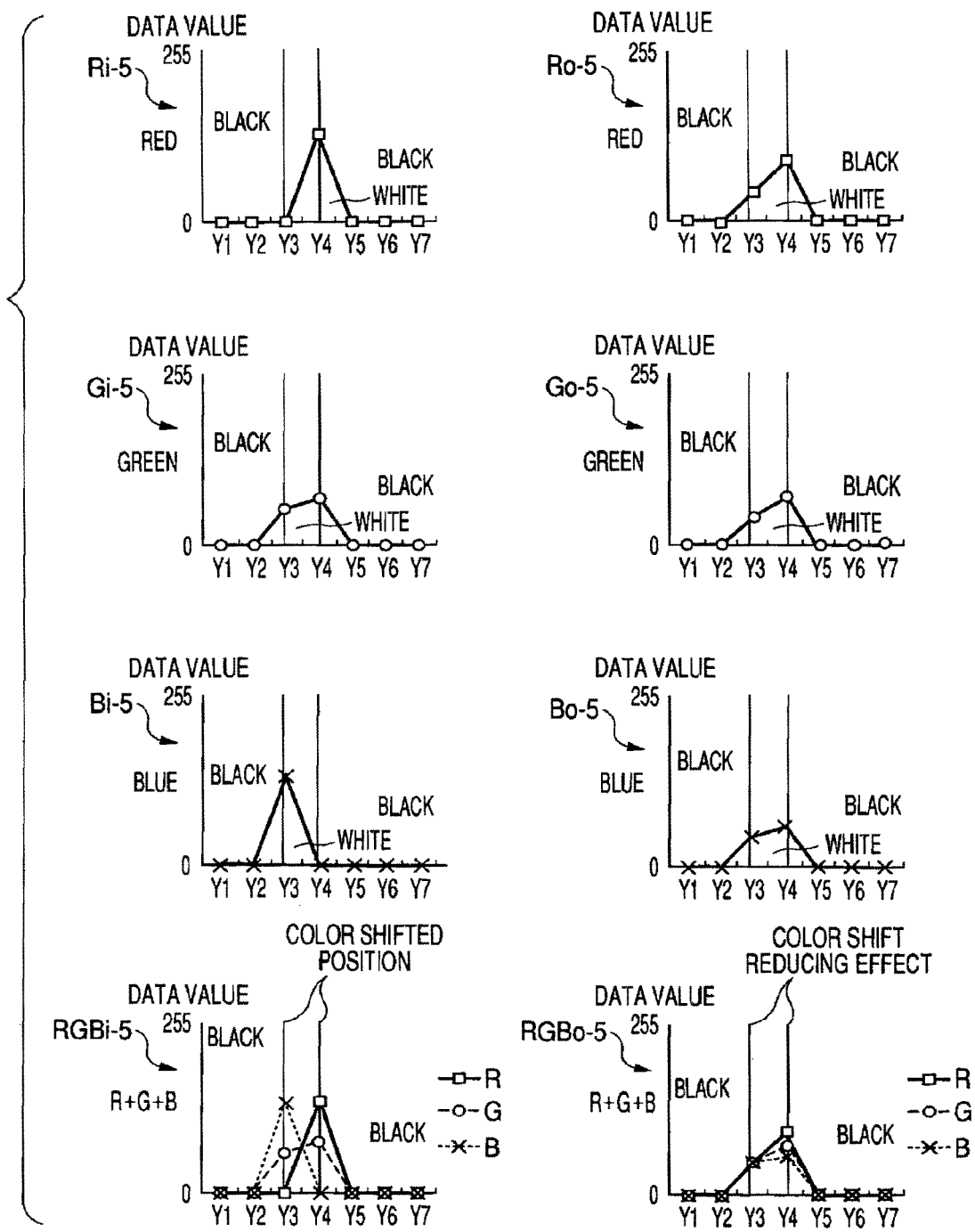
FIG. 5 is a series of tables specifically showing color shift removal effects obtained by performing the color shift correction processing in FIG. 1 for the white, fine line image in black background.

FIGS. 4 and 5 are diagrams showing color shift that occurred when white file lines having a width less than one line are present in a black background, and the reduction effects. The definitions of these tables in FIGS. 4 and 5 conform to those in FIGS. 2 and 3.

The intermediate value Crm(n) of the color difference data Cr for the vicinity of the target pixel P(n) is calculated by using the following expressions (7a) to (7d).

$$Crm(Y2) = \text{median}\{Cr(Y1), Cr(Y2), Cr(Y3)\} \quad (7a)$$
$$= \{0, 0, -48\}$$
$$= 0$$

$$Crm(Y3) = \text{median}\{Cr(Y2), Cr(Y3), Cr(Y4)\} \quad (7b)$$
$$= \{0, -48, 48\}$$
$$= 0$$

$$Crm(Y4) = \text{median}\{Cr(Y3), Cr(Y4), Cr(Y5)\} \quad (7c)$$
$$= \{-48, 48, 0\}$$
$$= 0$$

$$Crm(Y5) = \text{median}\{Cr(Y4), Cr(Y5), Cr(Y6)\} \quad (7d)$$
$$= \{48, 0, 0\}$$
$$= 0$$

The intermediate value Cbm(n) of the color difference data Cb can be obtained in the same manner.

Since, while referring to FIG. 4, after the color space conversion the value L of the value LCrCb (LCC-In-4) is monotonously decreased, or monotonously increased, except for position Y4, the replacement process at step S106 is performed for image data other than those at position Y4. On the other hand, since the decision at step S104 is False for the image data at position Y4, the replacement process at step S105 is performed.

As a result, the color difference at position Y3, where color shift has occurred, is changed from $$Cr(Y3)=-48$$

$$Cb(Y3)=84$$

to $$Cr'(Y3)=Crm(Y3)=0$$

$$Cb'(Y3)=Cbm(Y3)=0,$$

and the color difference at position Y4 is changed from $$Cr(Y4) = 48$$

$$Cb(Y4) = -84$$

to $$Cr'(Y4) = (Crm(Y4 \times 3 \times Cr(Y4)))/4$$

$$= (0 \times 3 - 48)/4 = 12$$

$$Cb'(Y4) = (Cbm(Y4) \times 3 + Cb(Y4))/4$$

$$= (0 \times 3 - 84)/4 = -21$$

that are obtained by using expressions (4a) and (4b). Therefore, the color shift can be removed at position Y3, and can be reduced at position Y4.

The effects are apparent from the graphs in FIG. 5. As shown in graph RGBi-5 in FIG. 5 before the color shift correction processing for this embodiment, due to color shift, a white pixel is separated into two pixels of different colors at positions Y3 and Y4. Whereas, in graph RGBo-5 after the color shift correction processing, the levels of the R, G and B image data almost overlap, and the color shift of the fine line is effectively reduced.

Figure 7:
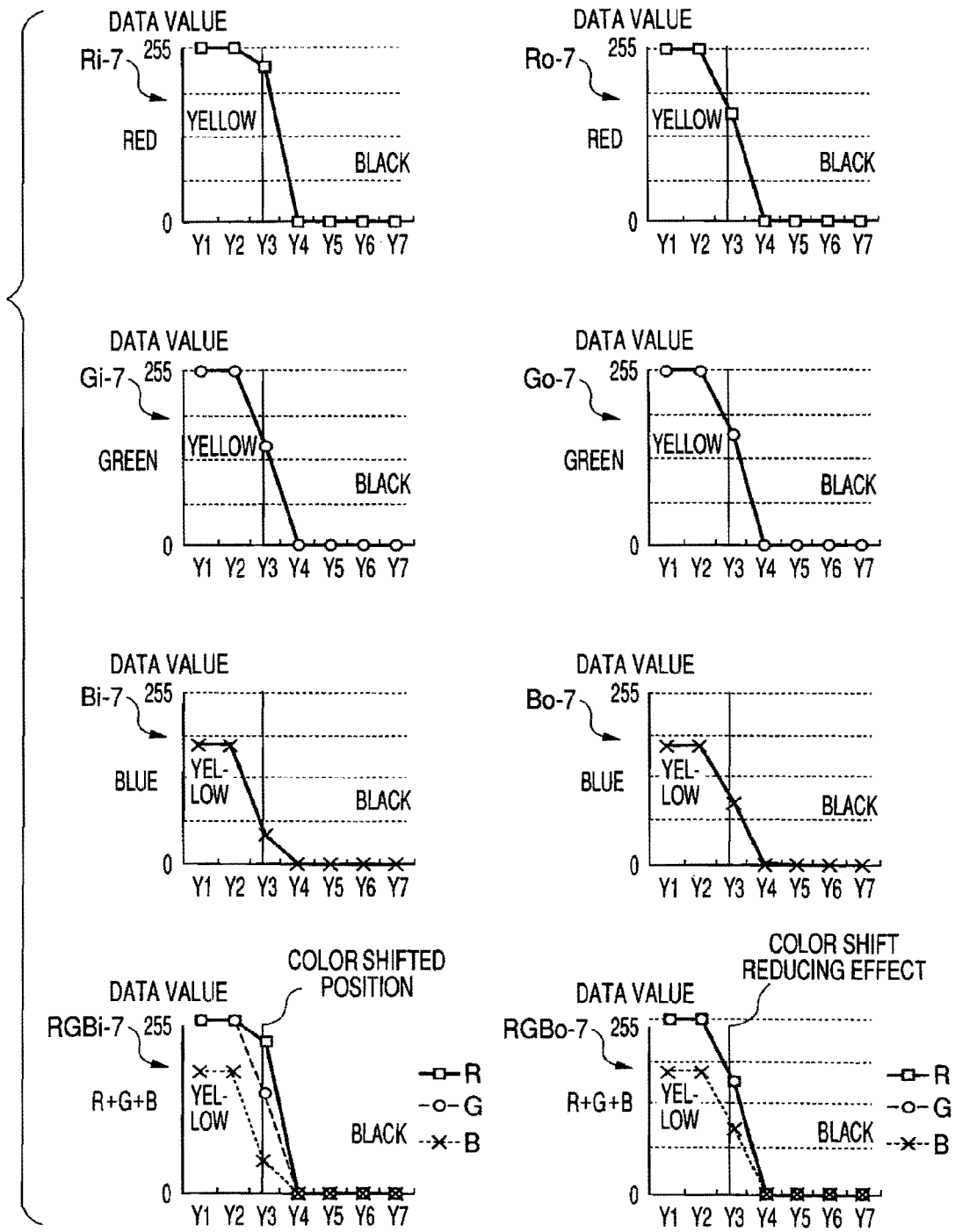
FIG. 7 is a series of tables specifically showing the color shift removal effects obtained by performing the color shift correction processing in FIG. 1 for the black character in yellow background.
Figure 8:
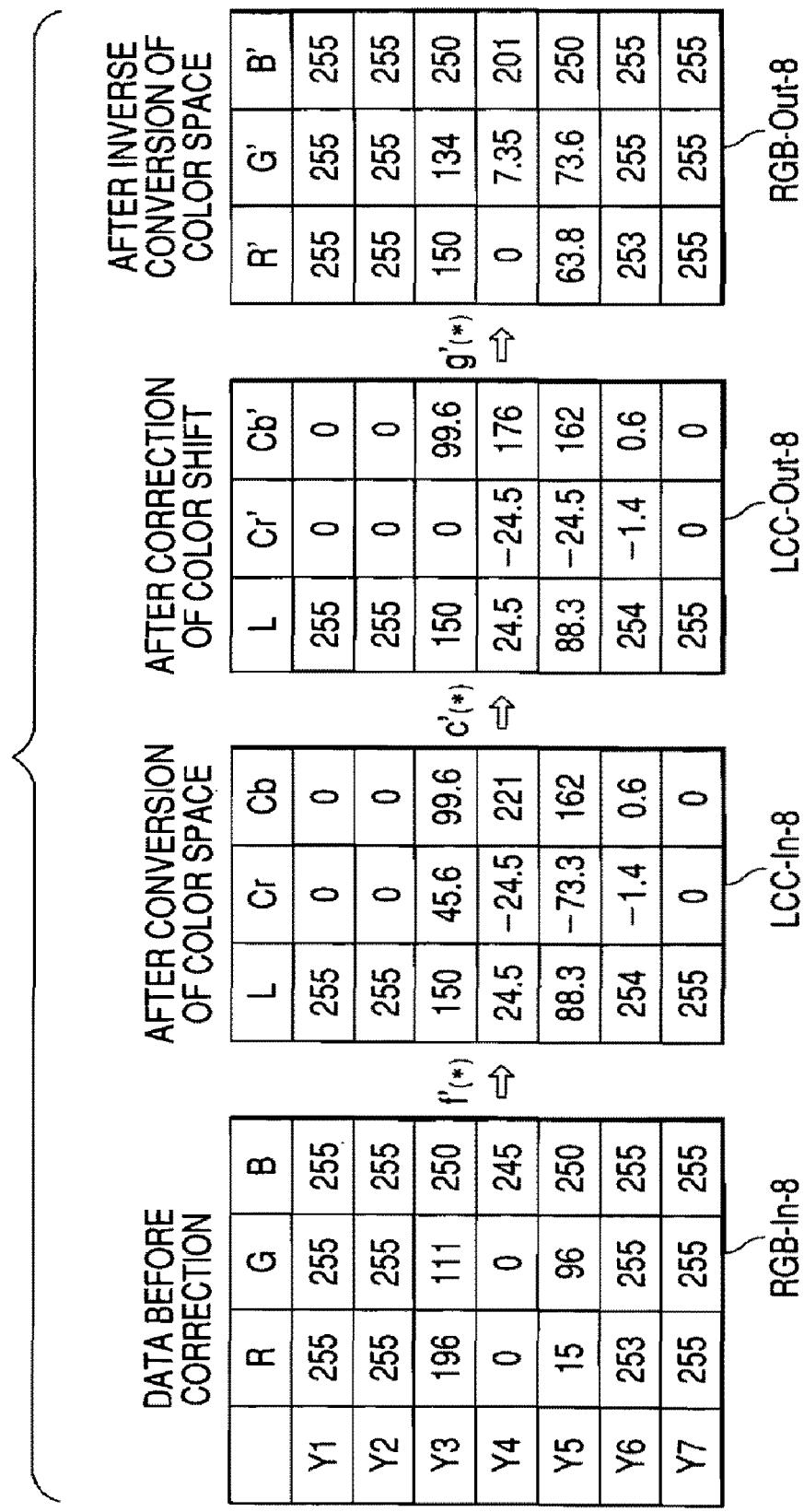
FIG. 8 is a series of tables specifically showing color shift removal effects obtained by performing the color shift correction processing in FIG. 1 for a blue line image in white background.
Figure 9:
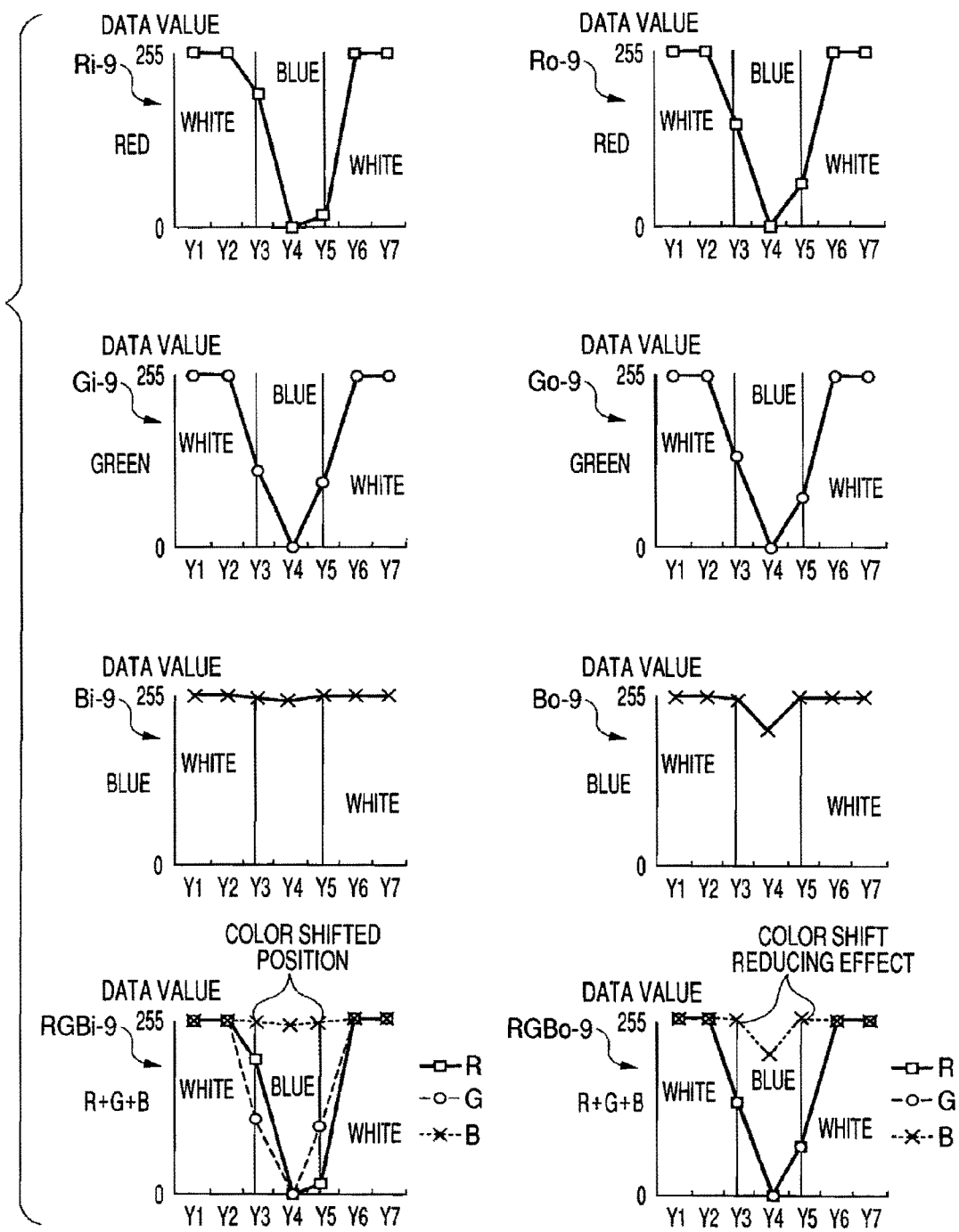
FIG. 9 is a series of tables specifically showing color shift removal effects obtained by performing the color shift correction processing in FIG. 1 for the blue line image in white background.

FIGS. 6 and 7 are diagrams showing color shift that has occurred at the edge portion (boundary portion) of a black character in a bright yellow background, and the reduction effects. FIGS. 8 and 9 are diagrams showing color shift that has occurred on both sides of a blue line, having the width of two or three lines, in a white background, and the reduction effects. The definitions of the tables and graphs conform to those as explained for FIGS. 2 to 5.

As is apparent from FIG. 6 or 9, according to the color shift correction processing for this embodiment, the color shift that has occurred in a chromatic color background or at the contour of a color character can be appropriately corrected, and a clear color character can be recovered.

In this embodiment, in the color space conversion process (step S102) for input image data, data for the target pixel P(n) and the preceding and succeeding pixels P(n−1) and P(n+1) are converted. At this time, the only pixel to be processed for the color space conversion the first time is the pixel P(n+1), and the pixels P(n) and P(N−1) are those previously processed for the color space conversion. Therefore, in this embodiment, to increase the operating efficiency, a storage area is prepared wherein luminance data and color difference data for pixels for which the color space conversion has been processed can be stored, and the converted values can be reused.

The luminance data L(i) at step S102 have been calculated by using expression (1a). However, when the gradation number of input/output data is large, the calculation can be performed by increasing the accuracy. For example, the calculation is performed by the generation of luminance data L through the conversion:

$$L(i)=0.30R(i)+0.59G(i)+0.11B(i) \tag{1a'}$$

As described above, according to the image processing method of this embodiment, through the software processing performed by using a comparatively simple algorithm, color shift that occurs in image data read by the line sensor can be effectively removed or reduced. Since color shift occurring especially in the chromatic color background of a character or at the contour of a color character can also be reduced, and not only a black character, but the entire character portion can be more clearly reproduced.

Figure 10:
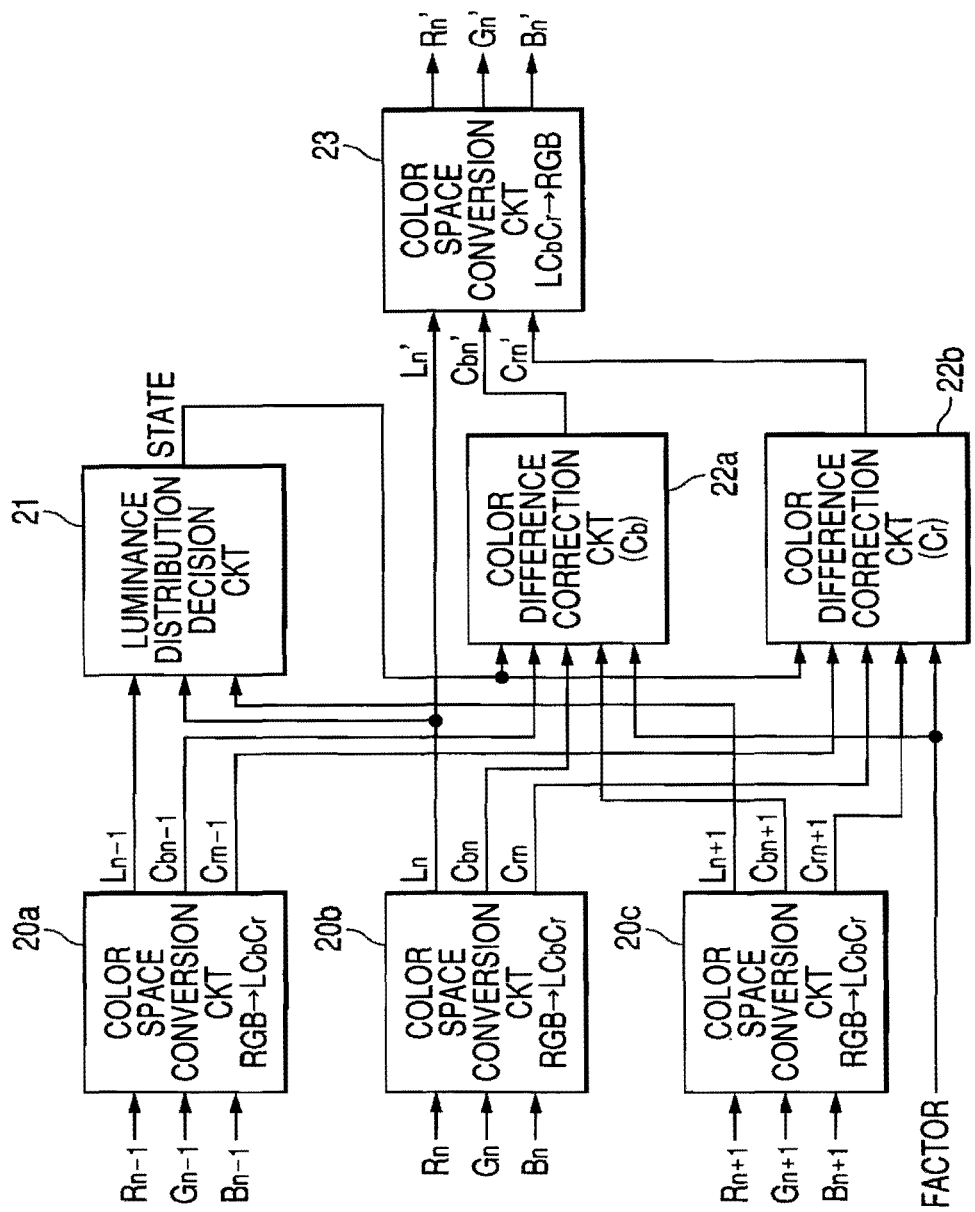
FIG. 10 is a block diagram showing the configuration of a color shift correction circuit that embodies the color shift correction processing in FIG. 1 by using hardware.
Figure 11:
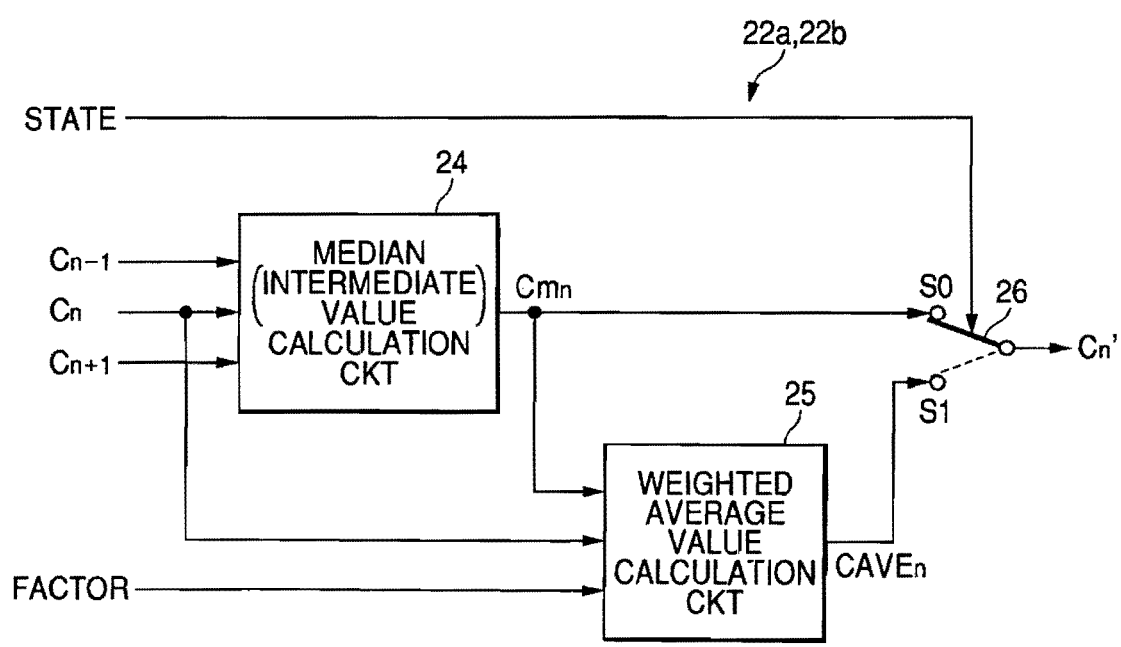
FIG. 11 is a detailed block diagram showing the arrangement of a color difference correction circuit in FIG. 10.

FIG. 10 is a block diagram showing the configuration of a color shift correction circuit that embodies the color shift correction processing by using hardware. FIG. 11 is a detailed block diagram showing the arrangement of color correction circuits 22a and 22b in FIG. 10.

In FIG. 10, color space conversion circuits 20a, 20b and 20c convert input RGB image data into luminance data L and color difference data Cb and Cr by using e.g. the following expressions (8a) to (8c).

$$L=0.3R+0.6G+0.1B \tag{8a}$$

$$Cr=R-L \tag{8b}$$

$$Cb=B-L \tag{8c}$$

The same structure is employed for the color space conversion circuits 20a, 20b and 20c, but the input image data differ. That is, RGB image data for the target pixel P(n) are transmitted to the color space conversion circuit 20b, and RGB image data for the adjacent pixels P(n−1) and P(n+1) that sandwich the target pixel P(n) are transmitted to the color space conversion circuits 20a and 20c.

A luminance distribution decision circuit 21 receives luminance data L(n), L(n−1) and L(n+1) for the target pixel and the adjacent pixels P(n−1) and P(n+1) from the color space conversion circuits 20b, 20a and 20c, and determines whether one of the following conditions (9a) and (9b) is established between the luminance data L(n), L(n−1) and L(n+1).

$$L(n-1) \geq L(n) \geq L(n+1) \tag{9a}$$

$$L(n-1) \leq L(n) \leq L(n+1) \tag{9b}$$

The definitions of these conditions are monotonous decreasing (9a) and monotonous increasing (9b), and when one of the conditions is satisfied, it is assumed that the target pixel P(n) is positioned at the edge portion of an image.

The decision is transmitted as an output signal State to the color difference correction circuits 22a and 22b. When the expression (9a) or (9b) is established, the signal has a value of True (e.g., a high level), and when either condition is not established, has a value of False (e.g., a low level).

The same structure is employed for the color difference correction circuits 22a and 22b, except that the input image data differ. Specifically, the color difference correction circuit 22a receives: color difference data Cb(n), Cb(n−1) and Cb(n+1) for the target pixel P(n) and the neighboring pixels P(n−1) and P(n+1) from the color space conversion circuits 20b, 20a and 20c; the signal State from the luminance distribution decision circuit 21; and a control constant (or control data) Factor, and outputs color difference data Cb'(n) for the target pixel P(n) for which color shift has been corrected. The color difference data correction circuit 22b receives color difference data Cr(n), Cr(n−1) and Cb(n+1) from the color space conversion circuits 20b, 20a and 20c, and the control constant Factor, and outputs color difference data Cr'(n) for the target pixel P(n) for which color shift has been corrected.

A color space conversion circuit 23 receives luminance data L(n) for the target pixel P(n) from the color space conversion circuit 20b, the color difference data Cb'(n) and Cr'(n), from the color difference correction circuits 22a and 22b, for which color shift has been corrected, and outputs values R'(n), G'(n) and B'(n) in the RGB color space.

Further, as shown in FIG. 11, each of the color difference correction circuits 22a and 22b includes an intermediate value calculation circuit 24, a weighted average value calculation circuit 25 and a selection circuit 26.

The intermediate value calculation circuit 24 selects and outputs the intermediate value Cm of three sets of input color difference data C(n−1), C(n) and C(n+1). Depending on the image, the color difference data C(n) of the target pixel differs from the sign of the intermediate value, i.e., the hue is inverted. In this case, circuit for changing Cm to "0", i.e., for changing Cm with the achromatic color characteristic, is added, so that an unnatural color difference correction can be prevented.

The weighted average value calculation circuit 25 employs the following expression (10) to calculate the intermediate value Cm output by the intermediate value calculation circuit 24, the color difference data C(n) of the target pixel P(n) and a control constant Factor that includes a value T, and outputs a weighted average value Cave(n).

$$Cave(n)=(Cm\times(T-1)+C(n))/T \qquad (10)$$

"T" is a given constant equal to or greater than "1". When "4", for example, is employed as "T", the weight applied to the intermediate value for color difference is "0.75", while the weight applied to the original color difference value of the target pixel is "0.25", and the color shift that has occurred along an achromatic color fine line having a width of one dot or smaller is reduced to about ¼. As previously explained for the operation of the intermediate value calculation circuit 24, when the sign of the color difference data C(n) of the target pixel P(n) differs from the sign of the weighted average value Cave(n), a circuit for changing the value of the weighted average value Cave(n) to "0" is added, so that an unnatural color difference correction can be prevented.

When the input signal State is True, the selection circuit 26 is changed to the terminal S0 side, and transmits, as color difference data Cn', the value output by the intermediate value calculation circuit 24. When the input signal State is False, the selection circuit 26 is changed to the terminal S1 side, and transmits, as color difference data Cn', the value output by the weighted average value calculation circuit 25.

Since, as described above, the color shift correction circuit embodies the color shift correction processing by using hardware, the operation of the color shift correction circuit is performed in the same manner as the color shift correction processing. Therefore, no detailed explanation for the operation will not be given.

Furthermore, although the color space conversion circuits 20a, 20b and 20c have employed expression (8a) to convert the input RGB image data to the luminance data L, another method may be so employed. And in order to reduce the size of the hardware configuration, the following expression (11) may be employed to acquire a result approximation using bit-shift calculations.

$$L=(R+2G+B)/4 \qquad (11)$$

However, when result approximation is acquired using expression (11), the specific ratio of the B image data to the R and G image data becomes twice or greater the converted value obtained by expression (8a), and B (or its complementary color Yr) more greatly affects the color density visual sensation experienced by a person. Thus, it is preferable that the correction value in expression (10) be adjusted. Specifically, it is conceivable that the ratio of the color difference data C(n) for the target pixel P(n) to the intermediate value Cm of the color difference in the neighboring pixels, including the target pixel, should be 1:1.

Figure 13:
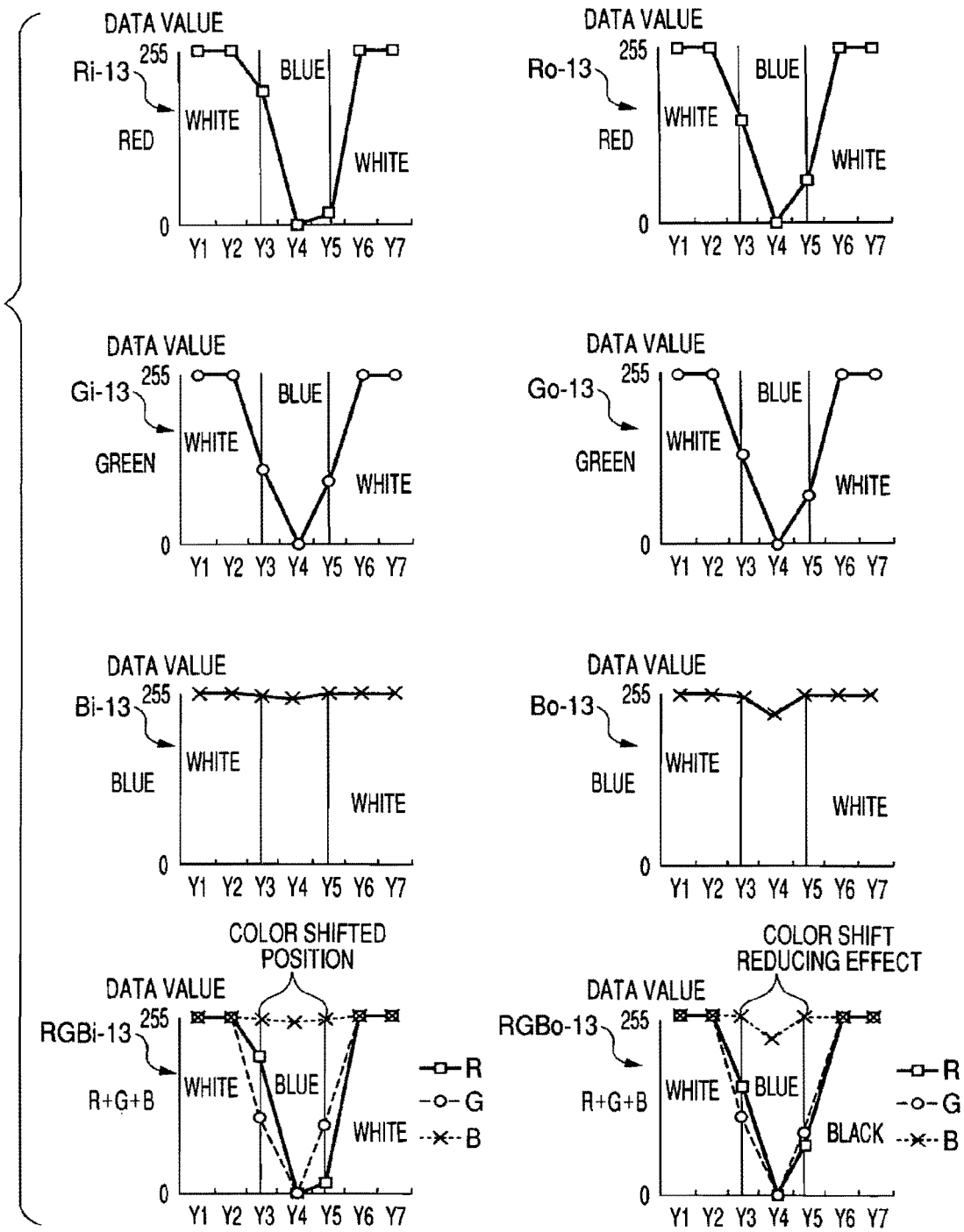
FIG. 13 is a series of tables specifically showing color shift removal effects obtained when the blue line image in white background is transmitted to the color shift correction circuit in FIG. 10.

FIGS. 12 and 13 are diagrams showing example color shift correction effects obtained by a configuration wherein, as a conversion to luminance data L, the color space conversion circuit performs the result approximation using expression (11), and control constant Factor (T) used for the color difference correction circuit is set as "2".

As is apparent from FIGS. 12 and 13, compared with the results (FIGS. 8 and 9) obtained by converting the luminance data L using the expression (8a) that does not take hardware size into consideration, satisfactory color shift reduction effects are obtained, even though the effects are slightly attenuated.

As is described above, a color shift correction circuit having a comparatively simple arrangement can effectively remove or reduce the color shift that occurs in image data that are read by a line sensor. Since especially the color shift that occurs in the chromatic color background of a character or at a contour of a color character can also be reduced, not only a black character, but an entire character portion can be more clearly reproduced. In addition, when the conversion expression used for the luminance data conversion circuit is simplified, a color shift correction circuit having a small hardware size can be provided while the affect produced by the color shift reduction effects can be minimized.

Second Embodiment

An image processing apparatus that employs an image processing method according to a second embodiment of the present invention will now be described.

The image processing apparatus of the invention is an apparatus that sequentially turns on light sources for three primary colors, R, G and B, that are used to illuminate the surface of an original, and that moves a contact image sensor that faces the surface of the original to read a color image. The image processing apparatus also includes a color shift correction function.

Figure 14:
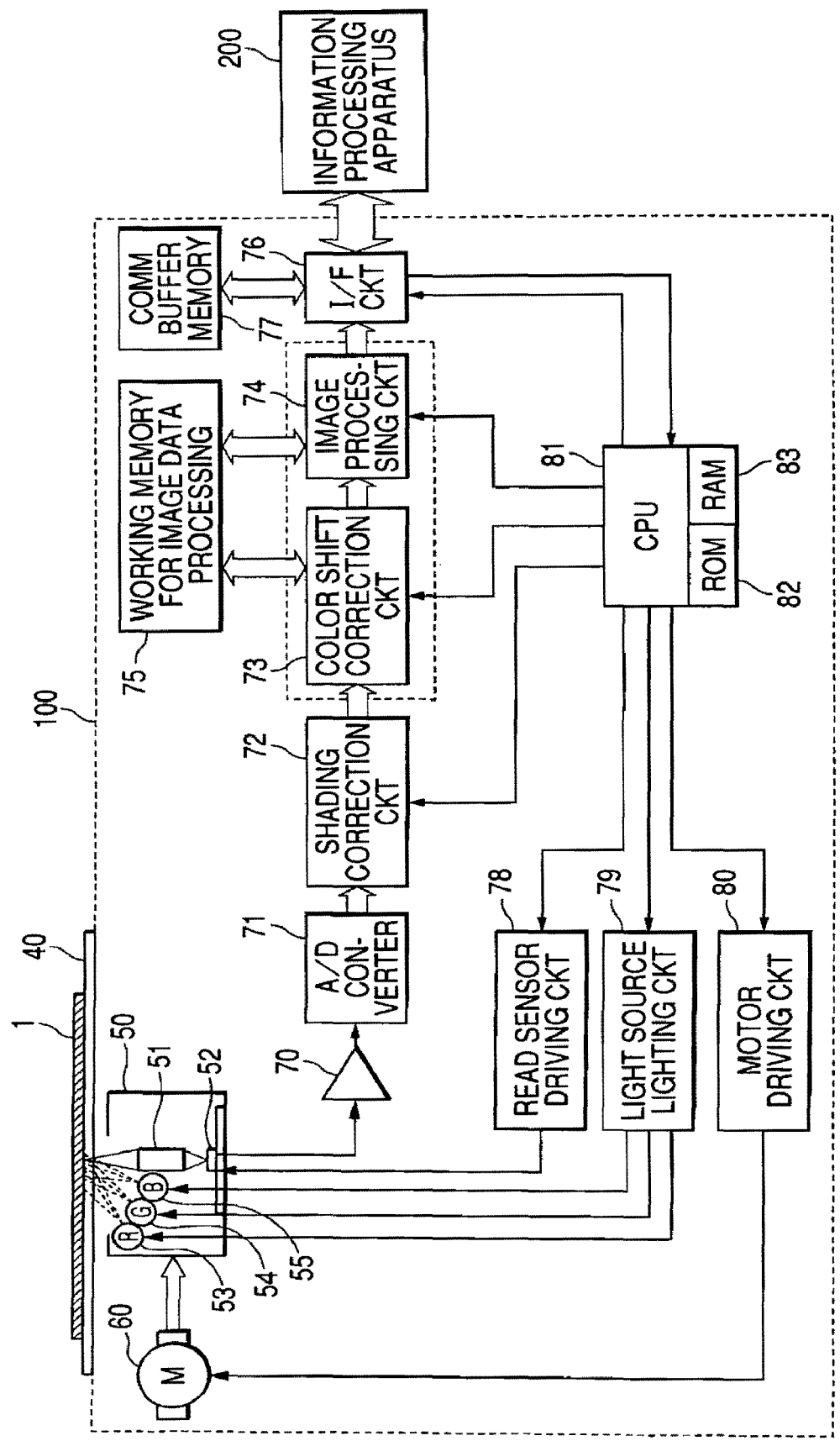
FIG. 14 is a schematic block diagram showing the configuration of an image processing apparatus employing an image processing method according to a second embodiment of the present invention.
Figure 15:
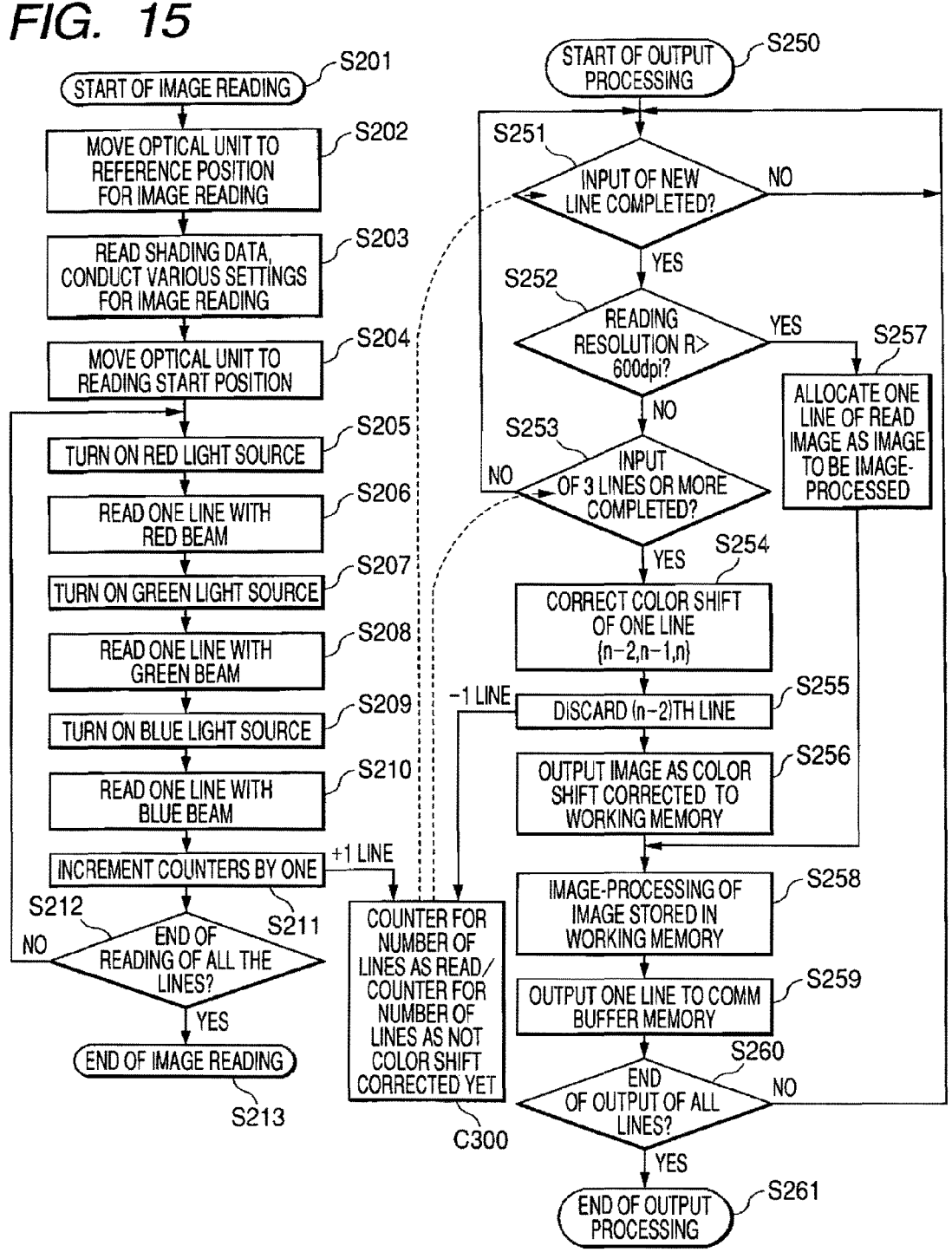
FIG. 15 is a flowchart showing the control processing performed by the image processing apparatus in FIG. 14.

FIG. 14 is a schematic block diagram showing the configuration of an image processing apparatus 100 according to this embodiment, and FIG. 15 is a flowchart showing the control processing performed by the image processing apparatus 100.

In FIG. 14, an original 1 to be read is mounted, reading face down, on a platen glass 40 for holding the original 1.

A radius optical unit 50 includes light sources 53, 54 and 55, an imaging lens 51 and a line sensor 52. The imaging lens 51 focuses on the line sensor 52 images of the original 1, irradiated by one of the light sources 53, 54 and 55, and in accordance with the density of the images, the line sensor 52 converts images having different brightnesses into electric signals and outputs the signals to a signal amplifier 70. The light sources 53, 54 and 55 output light in the three primary colors of R, G and B. In synchronization with the optical unit 50, which is powered by an optical unit drive mechanism that is driven by a motor 60, the light sources 53, 54 and 55 are sequentially turned on, and then, the images of the original, irradiated by light in the individual colors are converted into electric signals and are read by the line sensor 52.

The signal amplifier 70 amplifies analog signals output by the line sensor 52.

An A/D converter 71 converts analog image signals amplified by the signal amplifier 70 into digital signals.

A shading correction circuit 72 corrects discrepancies in sensitivities of the individual photo-electric converting elements of the line sensor 52, and uneven illumination luminance supplied by the light sources 53, 54 and 55 in the direction toward the line sensor 52.

A color shift correction circuit 73 corrects color shift of obtained image data, and corresponds to the color shift correction circuit (explained while referring to FIGS. 10 and 11) for the first embodiment.

An image processing circuit 74 performs image processing other than color shift correction, such as a variable magnification process for reducing or enlarging an image, a color masking process for adjusting color balance, a γ transform process for adjusting the density characteristic of an image and a space filtering process for reducing noise or increasing the sharpness of an image by using two-dimensional convolution calculation and differential calculation or averaging calculation.

A working memory 75 for the image data processing is used to temporarily store intermediate data generated by the color shift correction circuit 73 and the image processing circuit 74.

An interface circuit 76 is used when a Central Processing Unit (CPU) 81 communicates with an external information processing apparatus 200 or when the color shift correction circuit 74 transmits received image data to the external information processing apparatus 200.

A communication buffer memory 77 is used to store image data to be transmitted when the external information processing apparatus 200 temporarily halts reception of image data. With this arrangement, when communication is temporarily halted, the temporarily halting of the drive motor 60 and the optical unit 50 can be avoided, so that a reduction in the image quality and an extension in the reading time, due to vibrations caused by the halting and restarting of the optical unit 50, can be prevented.

A read sensor driving circuit 78 appropriately drives the radius sensor to output image data. A light source lighting circuit 79 sequentially turns on the light sources 53, 54 and 55 at appropriate timings. A motor driving circuit 80 drives the drive motor 60. And the read sensor driving circuit 78, the light source lighting circuit 79 and the motor driving circuit 80 are operated in synchronization with each other.

The CPU 81 controls the individual circuits 72, 73 and 74 and the driving circuits 78, 79 and 80 in accordance with a control program stored in an incorporated read only memory (ROM), and reads image data or communicates with the external information processing apparatus 200 via the interface circuit 76. A random access memory (RAM) 83 is a memory for temporarily storing, for example, variables required for a current operation.

The control processing performed by the image processing apparatus 100 will now be described in detail while referring to the flowchart in FIG. 15.

In FIG. 15, the image reading process at steps S201 to S213 and the image reading process at steps S250 to S261 correspond to the process for synchronously storing image data in the communication buffer memory 77 through a set C300 of a counter for the number of lines that are read and a counter for the number of lines for which color shift correction has not yet been processed.

First, when image reading is initiated (step S201), the CPU 81 permits the motor driving circuit 80 to drive the motor 60, which moves the optical unit 50 to a reference reading position (not shown) (step S202). The CPU 81 turns off the shading correction circuit 72 and the color shift correction circuit 73; sequentially turns on the light sources 53, 54 and 55; reads a reference white density face (not shown), mounted at the reference reading position, by emitting light in the individual colors; and calculates shading data to correct for uneven illumination and a difference in the sensitivities of the individual optical cells constituting the line sensor 52, and sets the shading data to the shading correction circuit 72. Since a well known shading calculation method can be employed, no detailed explanation for this will be given. Based on the intensity of the signal output by the line sensor 52, the CPU 81 designates, for the light source lighting circuit 79, the optimal values for the lighting times of the light sources 53, 54 and 55, designates, for the signal amplifier 70, the optimal analog signal amplification ratios, and completes the preparations for the image reading (step S203). Then, before the image reading, the CPU 81 moves the optical unit 50 to an image reading start position within a range designated by the external information processing apparatus 200 (step S204).

When the optical unit 50 has reached the image reading start position, the R light source 53 is turned on (step S205), one line of the original is read, and R image data are stored in the working memory 75 for the image data processing (step S206). Then, sequentially, the G light source 54 is turned on (step S207) and G image data are stored in the working memory 75 for the image data processing (step S208), and the B light source is turned on (step S209) and B image data are stored in the working memory 75 for the image data processing (step S210).

In this manner, the color image data for one line of the original are stored in the working memory 75 through the process at steps S205 to S210, and the values held by the counter set C300, i.e., the values held by the counter for the number of lines that have been read and the counter for the number of lines for which color shift correction has not yet been processed, are incremented by "1" (step S211).

When the number of lines that have been read reaches the total number of lines within the image reading range, the image reading end process (step S213) is performed, and the writing to the working memory 75 is terminated. When the reading within the image reading range is incomplete, however, the process at steps S205 to S211 and the reading operation performed by the emission of light in the R, G and B colors are repeated.

The output process (step S250) performed in parallel to the image reading process will now be described. The output process is initiated by the CPU 81 when, for example, at step S204 in the image reading process, the optical unit 50 starts to move to the reading position. Following this, the process waits until, during the image reading process, the counter, of the counter set C300 used in common, for the number of lines that have been read is examined, and new image data are stored in the working memory 75 for the image data processing (step S251). When the new image data have been stored, the process branches in accordance with a reading resolution (step S252).

(1) When the Reading Resolution is Equal to or Lower than 600 dpi

When the reading resolution is low, the optical unit 50 moves at a comparatively high speed and for a comparatively long distance until the light sources 53, 54 and 55 of R, G and B are switched. Therefore, color shift of an image that is read is noticeable and a color shift correction process is needed. Since images for the preceding and succeeding lines are required for color shift correction, a check is performed to determine whether image data for three lines or more are present in the working memory 75 (step S253). When there are not enough image data, the input of new image data is waited for. But when image data for three lines or more are present in the working memory 75, the image data are transmitted to the color shift correction circuit 73 (step S254), and after the color shift correction has been performed, the resultant image data are temporarily stored in the working memory 75 as image data to be processed at step S258 (step S256). Further, when the color shift correction for the (n−1)th line has been completed, image data for the preceding (n−2)th line that was input is not required and the value of the counter, of the counter set C300, for the number of lines that have been read is decremented by "1". As a result, the area in the working memory 75 that is occupied by image data is released.

(2) When the Reading Resolution Exceeds 600 dpi

When the reading resolution is high, the optical unit 50 moves at a low speed, and the reading positions of the R, G and B light sources 53, 54 and 55 are shifted less. Further, since at high resolution a change in the density is moderate at the edge of a character in an image, color shift is not very noticeable, and between when color shift correction is performed and when it is not performed, there is only a small difference in the sharpness of the image. Thus, the color shift correction process can be omitted. Therefore, when the reading resolution is high (step S252), image data that are obtained can be processed directly by the image processing circuit 74 that performs the variable magnification process, the color masking process, the γ transform process and the space filtering process. And the image data stored in the working memory for the image data processing are registered as image data to be processed at step S258 (step S257).

As described above, for reading performed at a low resolution, image data for which color shift correction has been performed are prepared in the working memory 75 for the image data processing (step S256). While for reading performed at a high resolution, image data stored in the working memory 75 can be directly employed for image processing (step S257), and the image processing circuit 74 performs the image processing, including the variable magnification process, the color masking process, the γ transform process and the space filtering process (step S258), and outputs the resultant data to the communication buffer memory 77 (step S259). As a result, image data for one line can be processed and transmitted to the external information processing apparatus 200 via the interface circuit 76.

Thereafter, a check is performed to determine whether the image processing for all the lines in the image reading area has been completed (step S260). When not all the lines have been completed, the process at steps 5251 to 5259 is continued. But when all the lines have been completed, the output of image lines is terminated (step S261).

Although not shown, a well known process for the transmission of data held in the communication buffer memory 77 can be performed and will be briefly explained. After the image processing has been performed, the interface circuit 76 sequentially transmits to the external information processing apparatus 200 the image data that are stored in the communication buffer memory 77, and when the transmission of image data for a predetermined number of lines has been completed, it transmits a transmission end notification to the CPU 81.

As described above, according to this embodiment, the performance and non-performance of color shift correction is selected depending on the reading resolution. Therefore, for a low resolution at which color shift is noticeable, color shift correction is performed to obtain sharply defined high quality image data, and for a high resolution at which color shift is less noticeable, the load imposed by color shift correction can be eliminated.

According to the embodiment, the color shift correction circuit mounted in the image processing apparatus controls the color shift correction process. However, the color shift process can be performed by the CPU of the image processing apparatus by employing computation. In this case, the advantage gained because the color shift correction process is not performed when the resolution is high is increased.

Further, according to the embodiment, the image processing apparatus performs the color shift correction; however, similar effects can also be obtained by using software to provide the processing performed by the external information apparatus.

Furthermore, according to the embodiment, a detailed explanation has been given for the color shift correction of a color image effected by changing the light sources. However, for a color image reading apparatus configuration wherein three or more arrays of photo-electric elements that can separate light into three or more colors are arranged on a line sensor, the present invention can also be applied, and the image quality improved, in a case wherein color shift due to discrepancies in the traveling speed of an optical unit occurs. This case also falls within the scope of the invention.

The object of the present invention is also achieved by supplying, to a system or an apparatus, a storage medium on which the program code for software that provides the functions of the above embodiments is recorded, and by permitting the computer (or a CPU or an MPU) of the system or the apparatus to read and execute the program code on the storage medium.

In this case, the program code read from the storage medium provides the innovative functions of the present invention, and the storage medium on which the program code is recorded constitutes the present invention.

The storage medium for supplying the program code can be, for example, a flexible disk, a hard disk, a magneto-optical disk, a CD-ROM, a CD-R, a CD-RW, a DVD-ROM, a DVD-RAM, a DVD-RW, a DVD+RW, a magnetic tape, a non-volatile memory card or a ROM. Or the program code may be supplied by a server computer via a communication network.

Further, the present invention not only includes a case wherein the functions of the above embodiments are provided by executing program code read by a computer, but also a case wherein, based on the instructions provided by the program code, the OS operated by the computer actually performs part or all of the processes and functions provided by the above embodiments.

Furthermore, the present invention also includes a case wherein the program code read from the storage medium is written to a memory prepared on a function extension board inserted into the computer or in a function extension unit connected to the computer, and based on the instructions contained in the program code, a CPU included on the function extension board or in the function extension unit can actually perform part or all of the processes and functions provided by the above embodiments.

This application claims priority from Japanese Patent Application No. 2004-223358 filed on Jul. 30, 2004, which is hereby incorporated by reference herein.

What is claimed is:

1. An image processing method for processing each pixel data of an input image obtained by reading an original image while a line sensor moves, relative to the original image, in a sub-scanning direction perpendicular to a main scanning direction, the image processing method including:

determining whether or not a target pixel is a pixel constituting any of a monotone increasing part and a monotone decreasing part of a luminance value of the input image, on the basis of luminance data for the target pixel and only two neighboring pixels, each positioned on an opposite side of the target pixel in the sub-scanning direction, with a luminance change detection circuit; by calculating new color difference data with a color difference data calculation circuit, wherein in the case the target pixel is determined to be a pixel constituting any of a monotone increasing part and a monotone decreasing part of a luminance value of the input image, by employing a median filter to the color difference data of the target pixel and the neighboring pixel and for outputting from the median filter color difference data as the new color difference data, and wherein in the case the target pixel is determined not to be a pixel constituting any of a monotone increasing part and a monotone decreasing part of a luminance value of the input image, by employing the median filter to the color difference data of the target pixel and the neighboring pixel and for calculating a weighted average value of color difference data that is output of the median filter and the color difference data of the target pixel, and for outputting the weighted average value of color difference data as the new color difference data; and synthesizing the new color difference data obtained from the color difference data calculation circuit with the luminance data for the target pixel with a color space conversion circuit to acquire new image data corresponding to the target pixel.

2. An image processing method according to claim 1, wherein the color difference data calculation circuit outputs an achromatic color data for the target pixel according to the luminance data, when the polarity of the new color difference data differs from the color difference data of the target pixel of the input image.

3. An image processing apparatus for performing image processing for pixels of read image data comprises:

an image reading unit for reading an original image while a line sensor moves, relative to the original image, in a sub-scanning direction perpendicular to a main scanning direction, and for outputting read image data;

a first color space conversion circuit for converting image data for the pixels of the read image data into luminance data and color difference data;

a luminance change detection circuit that determines whether or not the target pixel is a constituent pixel constituting any of a monotone increasing part and monotone decreasing part of a luminance value of the read image data, on the basis of luminance data for the target pixel and only two neighboring pixels, each positioned on an opposite side of the target pixel in the sub-scanning direction;

a median filter circuit for calculating an intermediate value between the color difference data for a target pixel and the two neighboring pixels of the target pixel, and for outputting first output color difference data;

a weighted average calculation circuit for calculating a weighted average value for the color difference data of the target pixel of the read image data and the first output color difference data, and for obtaining second output color difference data;

a color difference data selection circuit for, when the luminance change detection circuit detects that the target pixel is the constituent pixel, selecting the first output color difference data as new color difference data, and for, when the luminance change detection circuit detects that the target pixel is not the constituent pixel, selecting the second output color difference data as new color difference data; and a second color space conversion circuit for synthesizing the new color difference data, selected by the color difference data selection circuit, with the luminance data for the target pixel of the read image data so as to obtain new image data corresponding to the target pixel.

* * * * *